(12) United States Patent
Kabatek

(10) Patent No.: US 10,466,958 B2
(45) Date of Patent: Nov. 5, 2019

(54) AUTOMATED VIDEO RECORDING BASED ON PHYSICAL MOTION ESTIMATION

(71) Applicant: streamN Inc., Fort Collins, CO (US)

(72) Inventor: Michael Kabatek, Fort Collins, CO (US)

(73) Assignee: StreamN Inc., Fort Collins, CO (US)

( * ) Notice: Subject to any disclaimer, the term of this patent is extended or adjusted under 35 U.S.C. 154(b) by 0 days.

(21) Appl. No.: 15/633,228

(22) Filed: Jun. 26, 2017

(65) Prior Publication Data

US 2017/0344337 A1 Nov. 30, 2017

Related U.S. Application Data

(63) Continuation of application No. 14/874,195, filed on Oct. 2, 2015, now Pat. No. 9,690,541.

(60) Provisional application No. 62/201,066, filed on Aug. 4, 2015.

(51) Int. Cl.
*G06F 3/16* (2006.01)

(52) U.S. Cl.
CPC .................................. *G06F 3/165* (2013.01)

(58) Field of Classification Search
CPC ........ H04N 5/77; H04N 7/181; H04N 5/2256; H04N 5/247; H04N 9/8211; H04N 19/132; H04N 19/136; H04N 19/587; H04N 19/80; H04N 5/772; H04N 7/0102; H04L 67/306; H04L 67/42; H04L 67/04; H04L 67/1095; H04L 67/1097; A63F 13/10; A63F 13/12; A63F 13/422; A63F 2300/1093; A63F 2300/201; A63F 2300/204; A63F 2300/6045; H04M 15/31; H04M 15/41; H04M 15/43

USPC ...... 381/56–58; 700/94; 348/208.06, 208.16, 348/208.77, 208.99; 386/242
See application file for complete search history.

(56) References Cited

U.S. PATENT DOCUMENTS

| | | | | |
|---|---|---|---|---|
| 8,976,254 B2 * | 3/2015 | Price | .................... | H04N 19/132 348/208.1 |
| 9,690,541 B2 * | 6/2017 | Kabatek | .................. | G06F 3/165 |
| 2013/0182107 A1 * | 7/2013 | Anderson | .............. | G08B 21/02 348/143 |
| 2014/0133548 A1 * | 5/2014 | Mate | .................... | H04N 9/8205 375/240.02 |
| 2014/0273859 A1 * | 9/2014 | Luna | .................... | H04W 4/008 455/41.3 |

(Continued)

FOREIGN PATENT DOCUMENTS

GB 2459707 * 11/2009 ............... H04H 6/33

*Primary Examiner* — Lun-See Lao
(74) *Attorney, Agent, or Firm* — Hamilton Patent Services LLC

(57) ABSTRACT

The present disclosure involves a method for automating media audio volume based on the physical motion of a mobile computing device. In one embodiment, the method includes detecting motion of the mobile device based on input motion data from a motion detection mechanism, determining whether the detected motion of the mobile device exceeds a configured motion threshold, based on the determining, causing a logical state change to transition into a automated volume state, and after the logical state change to transition to the automated volume state, automatically configuring the audio volume of audio output provided by a mobile computing device based on configured volume and fade parameters.

20 Claims, 14 Drawing Sheets

(56) References Cited

U.S. PATENT DOCUMENTS

| | | | |
|---|---|---|---|
| 2015/0362991 A1* | 12/2015 | Koga | G06F 3/013 |
| | | | 715/810 |
| 2017/0236551 A1* | 8/2017 | Leiberman | G11B 27/036 |
| | | | 386/285 |

* cited by examiner

AUXILIARY MOTION CONTROL LOGIC - 1400

AUTOMATED VIDEO RECORDING BASED ON PHYSICAL MOTION ESTIMATION

CROSS-REFERENCE

This application is a continuation of co-pending application Ser. No. 14/874,195 filed on Oct. 2, 2015, which claims priority to provisional application Ser. No. 62/201,066, filed on Aug. 4, 2015, each of which is hereby incorporated herein by reference.

FIELD OF THE INVENTION

The present invention relates to the field of physical motion detection, audio signal processing and in particular, to the automatic adjustment of media audio volume in response to estimates of acceleration, velocity, or sustained physical motion of a mobile computing device.

BACKGROUND

It is a common practice for individuals to listen to music using a mobile computing device (smartphone, wearable computer, etc.) during activities involving physical motion such as, but not limited to, skiing, snowboarding, and mountain biking. In these scenarios it is often cumbersome or potentially dangerous to adjust the music volume of a mobile computing device via traditional means of the device's volume buttons, on screen volume controls, or headphone remote controls.

SUMMARY

Presented herein, in various embodiments, are a system and associated method for automating the volume of a mobile computing device based on the device's general physical motion. One embodiment provides for a method to detect the motion of a mobile device based on input motion data from a motion detection mechanism, where the method comprises determining whether the detected motion of the mobile device exceeds a configured motion threshold, based on the determining, causing a logical state change to transition into a automated volume state, and after the logical state change to transition to the automated volume state, automatically configuring the audio volume of audio output associated with a media application executing on the mobile computing device based on configured volume and fade parameters.

One embodiment provides for a non-transitory computer readable medium storing instruction which, when executed by one or more processors, cause the one or more processors to perform operations comprising the method described herein. Additionally other motion based interactions with a mobile device may be performed, including synchronized audio playback among multiple mobile computing devices or starting and stopping the recording of video based on the motion of a mobile computing device.

One embodiment provides for a system on a mobile computing device for automating media volume based on the physical motion of a mobile computing device, the mobile computing device having one or more processors to execute instructions from computer readable media to perform operations of the system, wherein the system comprises a motion detection unit to detect motion of a mobile device based on a motion detection mechanism including one or more of a motion sensor and a global positioning system receiver, a state change unit to determine, based on input from the motion detection unit, whether a change in motion state has occurred and transition into an automated volume state based on the determination, and a fade volume unit to automatically configure the audio volume of audio output associated with a mobile computing device based on configured volume and fade parameters.

BRIEF DESCRIPTION OF THE DRAWINGS

Embodiments are illustrated by way of example and not limitation in the Figures of the accompanying drawings, in which.

DETAILED DESCRIPTION

In various embodiments, a system and method is disclosed for automating audio volume during media playback based on the physical motion of a mobile computing device. While automatic, automated, and/or remote volume control exist in the art, there has yet to be a well defined method for automating music or media volume based on the physical motion of a mobile computing device. For example, it is a common practice for individuals to listen to music or other audio (e.g., podcasts, news, etc.) using a mobile computing device during activities involving physical motion (e.g., skiing, snowboarding, mountain biking, etc.). However, during such motion based physical activities it is often cumbersome to adjust the media volume of a mobile computing device via traditional means of the device's volume buttons, on screen volume controls, or headphone remote controls due to the physical demands of the activities.

Embodiments described herein provide for a system and associated method for automating the volume of a mobile computing device based on the device's general physical motion. Many modern mobile computing devices such as smartphones, wearable computers, and portable media devices incorporate sensors for estimating a device's position, velocity, acceleration, angular velocity, magnetic field, and many other physical quantities. In a simple application the media volume of a smartphone depends on the smartphone's physical motion, which is estimated through measurements obtained from the smartphone's global positioning system (GPS), accelerometer, gyroscope, and/or magnetometer. Using this data, software and hardware logic can be used to automatically configure the audio volume of a smartphone or other mobile device during music or other audio playback. The audio volume can be modified based on user-defined motion thresholds, volume levels, and volume fade speed, to enable hands free media volume automation in situations where handling a mobile device, and adjusting the device's volume via traditional means is cumbersome or prohibitive.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright stream$^N$, Inc. 2015.

Figure 1:
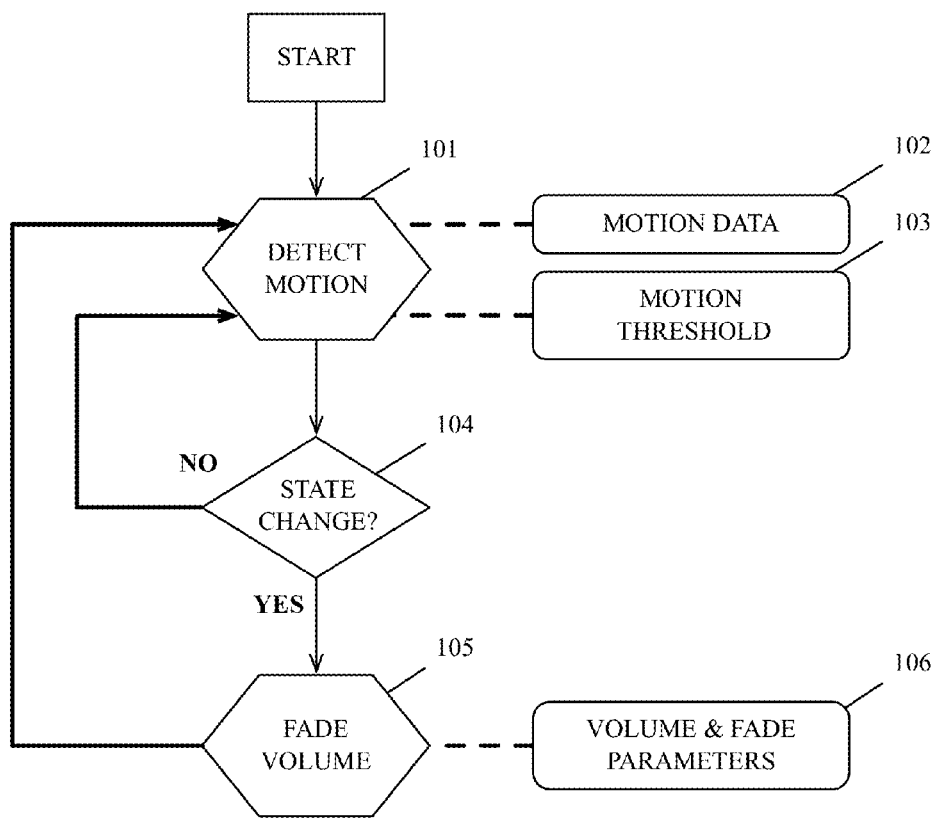
FIG. 1 is a flow diagram illustrating a method for automating media volume of a mobile computing device based on the device's detected physical motion.

FIG. 1 is a flow diagram illustrating a method for automating audio volume of a mobile computing device based on the device's detected physical motion, according to an embodiment. In one embodiment, the method is implemented as two sub-processes, a detect motion 101 process and a fade volume 105 process. In one embodiment, the detect motion 101 process continually determines the motion state of the device. A state change 104 conditional statement checks to see if the device's motion state has changed. If the motion state has not changed the detect motion 101 process repeats. If the motion state has changed the fade volume 105 process is carried out.

In one embodiment the detect motion 101 process can assume one of two states: ON or OFF. The ON state indicates the device motion data 102 is currently exceeding the motion threshold 103, and is therefore in physical motion. The OFF state indicates the device motion data 102 does not exceed the motion threshold 103, and is therefore not in physical motion. The motion data 102 is an estimation of the device's physical motion. Physical motion refers to any measurement or combination of measurements acquired from a device's accelerometer, gyroscope, magnetometer, GPS, or other sensors, which may be used to estimate the physical motion of the device. Examples of physical motion are the device's linear or angular acceleration, velocity, or changes in the device's local magnetic field orientation, based on data acquired from the device's sensors.

The motion threshold 103 is a threshold value, which is compared to motion data 102 to decide if the motion state is ON or OFF. The state change 104 is a conditional statement that checks if the device's motion state transitions from OFF to ON, or ON to OFF. If a state change occurs the fade volume 105 process is invoked. Otherwise, the detect motion 101 process is repeated. The fade volume 105 process uses the current motion state (ON or OFF), and user-defined volume & fade parameters 106 to adjust the media volume accordingly. The volume & fade parameters 106 are user-defined values that determine the device's volumes while in the ON and OFF states, and the duration in which the system transitions between the ON state volume to the OFF state volume.

The method described allows for an arbitrary combination of volume automation possibilities based on the general physical motion of a mobile computing device. The method may operate through software programs run on a processor or controller. Dedicated hardware implementations including, but not limited to, application specific circuits, programmable logic arrays and other devices can likewise be constructed to implement this system. Furthermore, alternative software implementations including, but not limited to, distributed processing or component/object distributed processing, parallel processing, or virtual machine processing can also be constructed to implement the described method.

Figure 2:
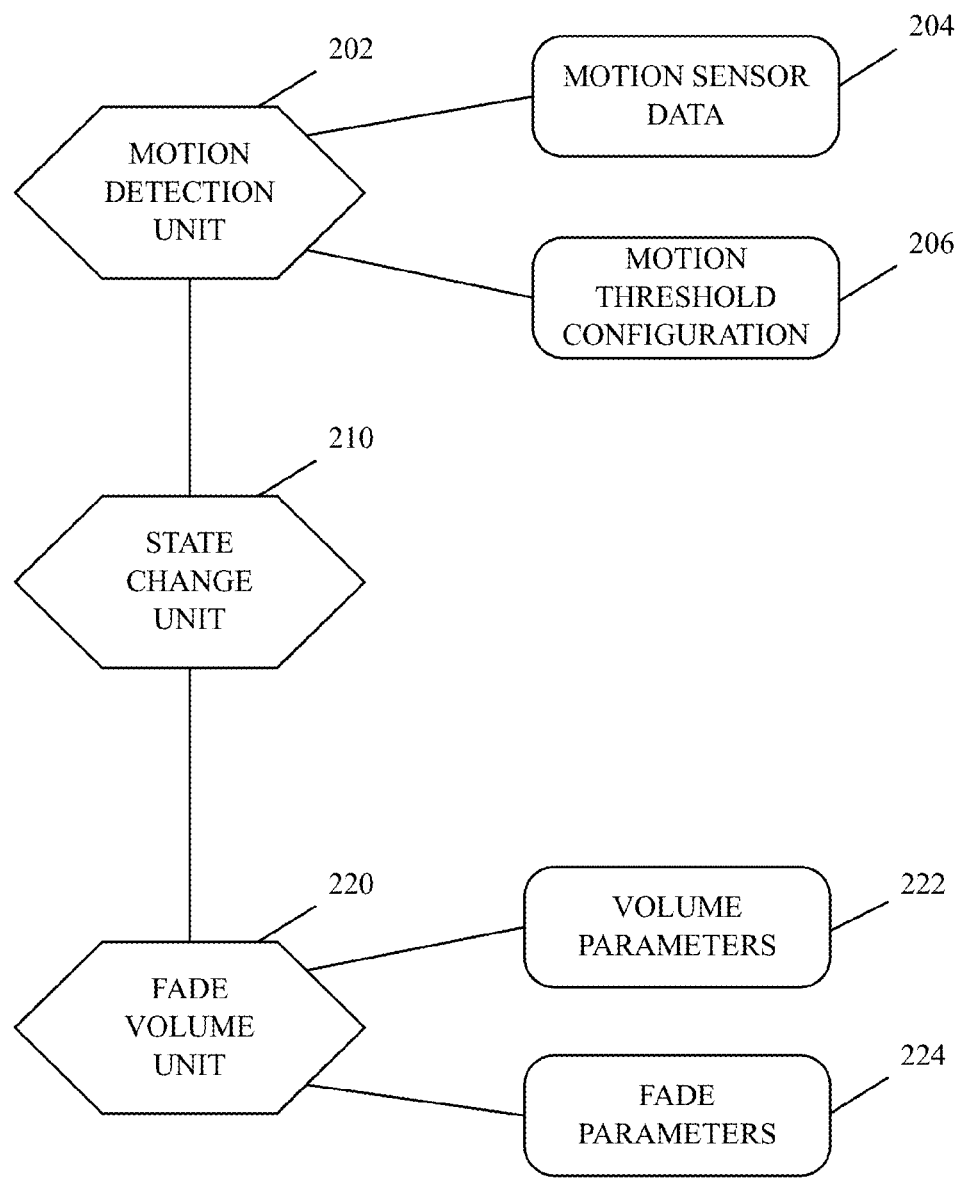
FIG. 2 is a block diagram illustrating a system for automating media volume of a mobile computing device based on the device's detected physical motion.

FIG. 2 is a block diagram illustrating a system for automating audio volume of a mobile computing device based on the device's detected physical motion. In one embodiment, the system includes a motion detection unit 202, a state change unit 210, and a fade volume unit 220. The motion detection unit 202 can receive input including motion sensor data 204 from one or more motion sensors including a global positioning system (GPS) receiver, or another mechanism for detecting motion such as an accelerometer, gyroscope, and/or magnetometer. The motion detection unit can also receive input including data defining a motion threshold configuration 206, which the motion detection unit can use to determine whether to trigger the state change unit 210.

In one embodiment, the state change unit 210 includes logic to determine, based on input from the motion detection unit 202, whether a change in motion state has occurred. The change in motion state, as determined by the state change unit 210, can be used to determine whether to activate the fade volume unit 220 to fade (e.g., adjust) the volume of a mobile device. In one embodiment, the fade volume unit 220 is configured to adjust the volume of a smartphone device based on input including motion sensor data 204, volume parameters 220, and fade parameters 224. In one embodiment, the volume parameters 222 and fade parameters 224 are provided by a user of the electronic device via a configuration menu. In one embodiment, the fade volume unit 220 is configured to adjust the volume of a specific application during motion, such that the music, or other audio playback generated by the specific application can be started, stopped, or volume adjusted based on motion data provided by the motion detection unit 202.

Figure 3:
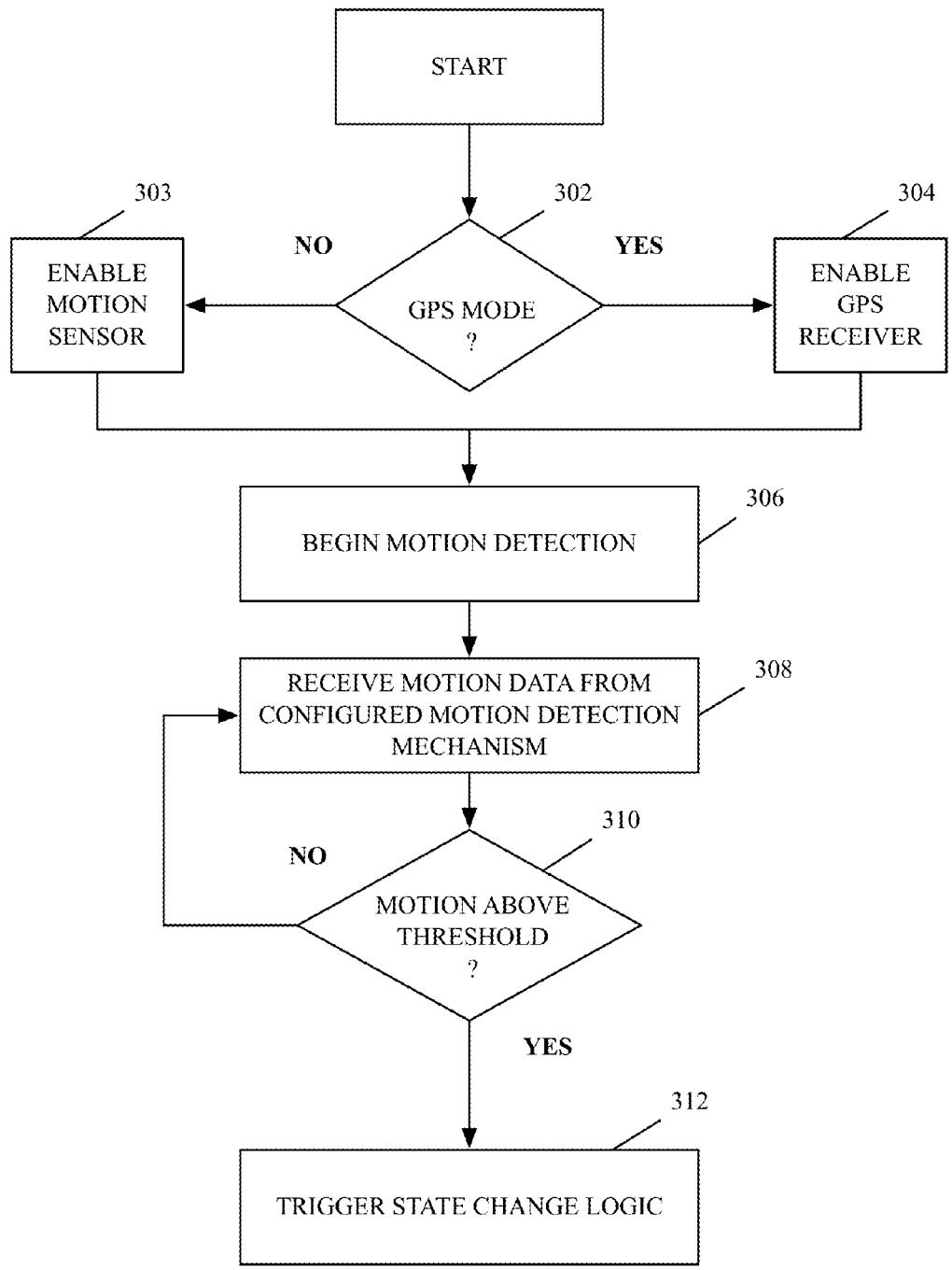
FIG. 3 is a flow diagram illustrating a detailed process for automating media volume of a mobile computing device based on the device's detected physical motion.

FIG. 3 is a flow diagram illustrating a detailed process for automating audio volume of a mobile computing device based on the device's detected physical motion. In one embodiment the method of FIG. 1 is implemented as software logic executing on a mobile data processing system, such as a smartphone mobile device. In such embodiment, the logic can begin by determining whether or not to enable GPS mode at block 302. If GPS mode is enabled at block 302, then the logic can enable a GPS receiver at block 304, to determine the motion of the mobile device, and accordingly, the user of the mobile device, using GPS data. If GPS mode is not enabled at block 302, then the logic can enable the motion sensor at block 303. In one embodiment, the logic can enable both the motion sensor and the GPS receiver 304.

Once a motion detection mechanism is enabled the logic can begin motion detection at block 306, for example, via the motion detection unit 202 of FIG. 2. At block 308 the logic can proceed to receive motion data from the configured motion detection mechanism (e.g., motion sensor and/or GPS). If the logic determines that the motion is above a configured motion threshold at block 310, the logic can trigger state change logic at block 312. Otherwise, the logic returns to block 308 to receive motion data from the configured motion detection mechanism.

Figure 4:
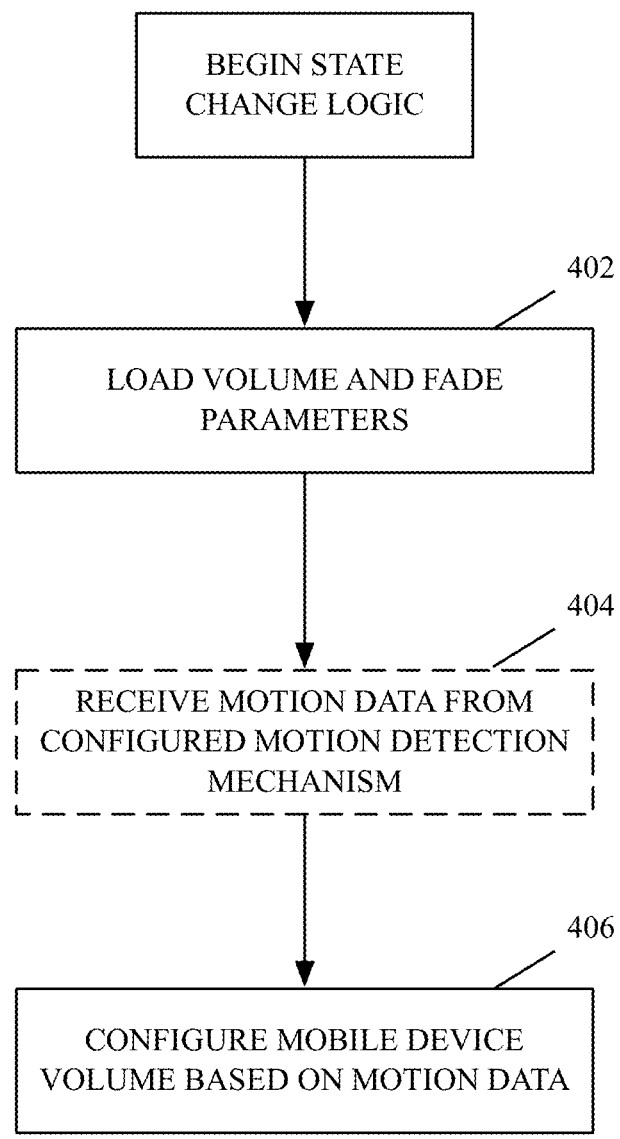
FIG. 4 is a flow diagram illustrating details of state change logic according to an embodiment.

FIG. 4 is a flow diagram illustrating details of state change logic according to an embodiment. In one embodiment, after triggering the state change logic at block 312 in FIG. 3, the mobile data processing logic can load volume and fade parameters at block 402. The volume and fade parameters can be the default volume and fade parameters or can be parameters that are adjusted to suit a specific user. In one embodiment the logic can optionally receive motion data from the configured motion detection mechanism (e.g., motion sensor and/or GPS) at block 404. In one embodiment, the logic can use the motion data and the volume and fade parameters to configure mobile device volume based on motion data at block 406. The mobile device volume can be configured to fade to the configured ON state volume when the detected or estimated motion is above a configured threshold and fade to the configured OFF state volume when the detected or estimated motion is below a configured threshold.

In one embodiment, the received motion data from the configured motion detection mechanism at block 404 can be used to increase or decrease the rate of change of the volume from a configured OFF state volume to a configured ON state volume. In one embodiment, configuring a volume associated with a state to zero can pause playback. In one embodiment, the received motion data at block 404 can cause the logic at block 406 to increase or decrease the volume of the mobile device in proportion to the detected or estimated velocity of the mobile device. In one embodiment, no additional motion data is received after the triggering the state change logic at block 312 of FIG. 3. In such embodiment the state change logic, at block 406, configures the mobile device volume to fade between the volumes configured for the ON and OFF state at a fixed rate of transition as specified by a fade speed parameter.

Figure 5:
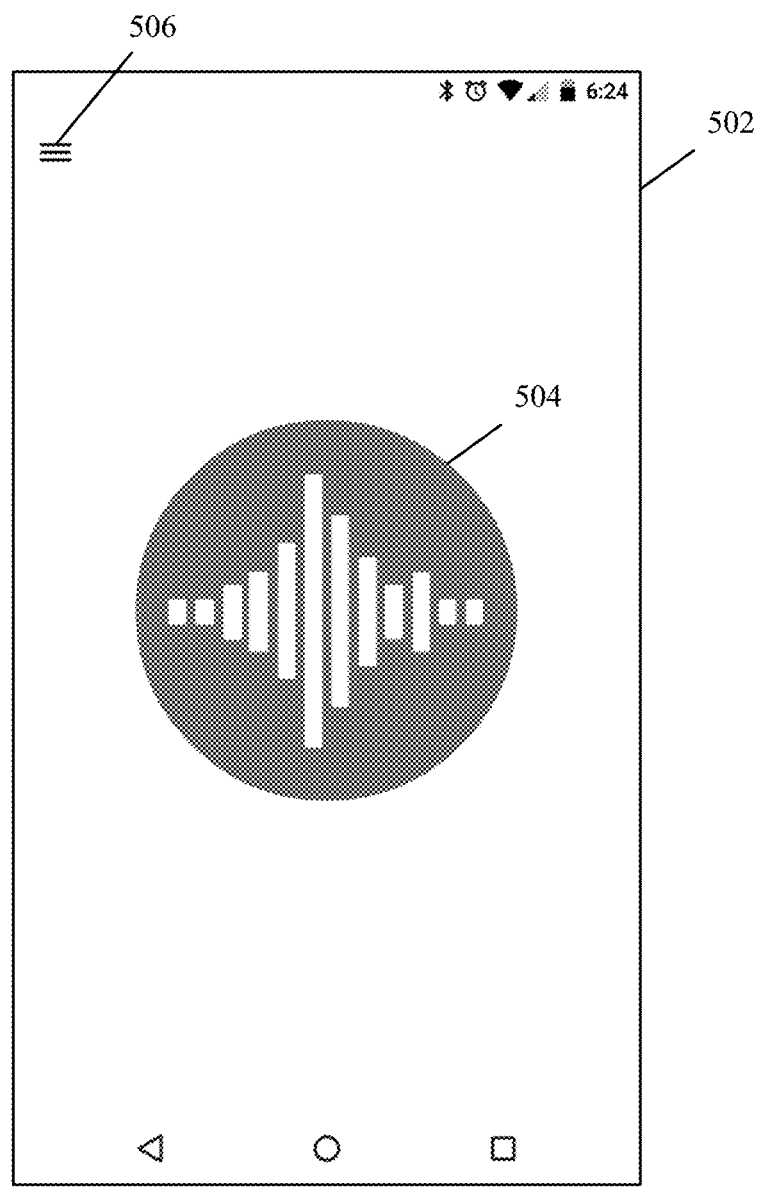
FIG. 5 is an illustration of an exemplary user interface for software logic to automate media volume on a mobile computing device.

FIG. 5 is an illustration of an exemplary user interface for software logic to automate audio volume on a mobile computing device. The software logic can execute as an application on a mobile device, such as a smartphone, or another mobile electronic device. The exemplary user interface for the software logic can be displayed on a display window 502 of a mobile device. The user interface includes an activation region 504 that may be touched to activate or de-activate the volume fade feature of the software logic. In one embodiment, other mechanisms for activation are also available. Also included is a menu icon 506 that can be touched to configure the software logic.

Figure 6:
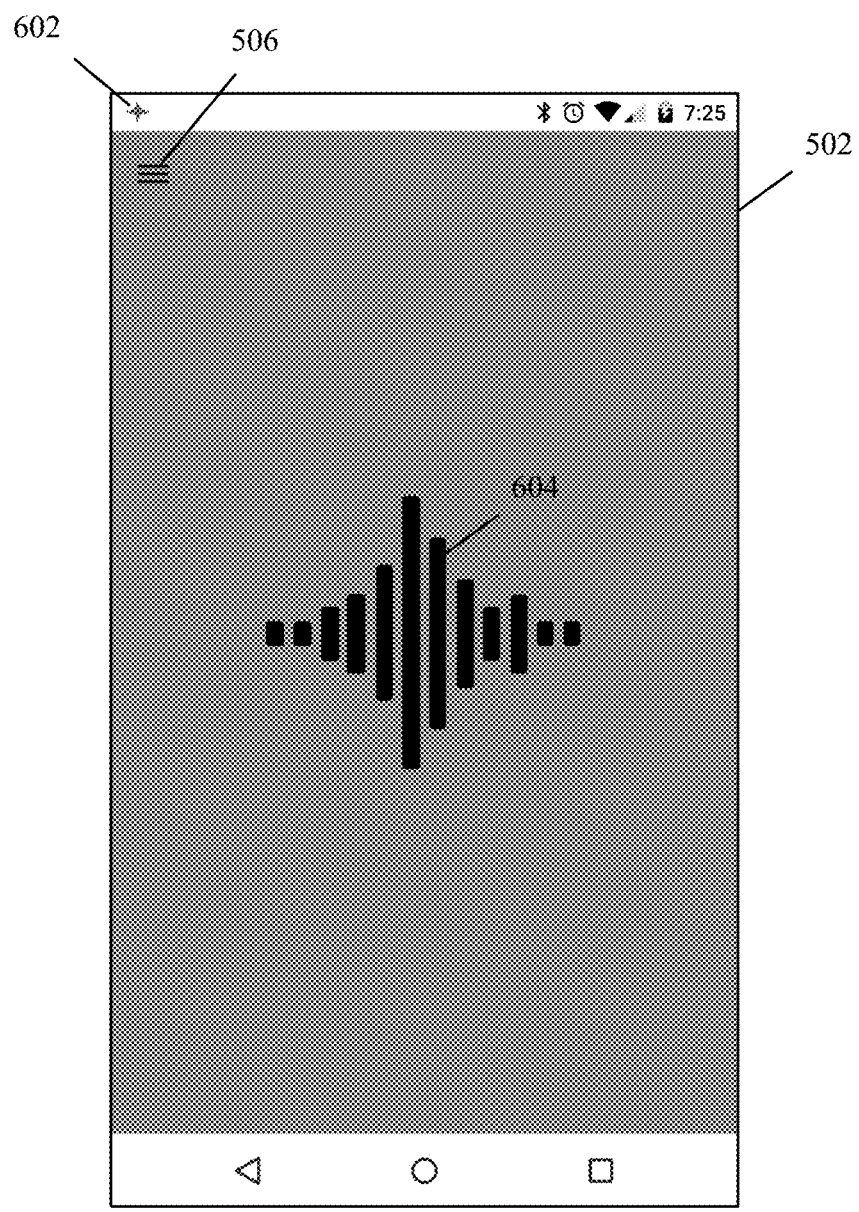
FIG. 6 is an additional illustration of an exemplary user interface for software logic to automate audio volume on a mobile computing device.

FIG. 6 is an additional illustration of an exemplary user interface for software logic to automate audio volume on a mobile computing device. As illustrated, the software logic has been enabled by a user via the activation region 504 of FIG. 5. Once enabled, the display window 502 of the mobile device can display a visible indication that the automated volume feature of the software logic is active, for example, via a change in the color scheme that is triggered by the software logic. In one embodiment, an icon 602 can be displayed in a status menu of the mobile device to indicate that the automated volume feature of the software logic is active, should the user cause a different application or unit of software logic to become the foremost application on the mobile device. To de-activate the automated volume feature of the software logic a user can touch, or otherwise interact with a deactivation region 604 that is displayed on the mobile device display 502 while the automated volume feature is active.

Figure 7:
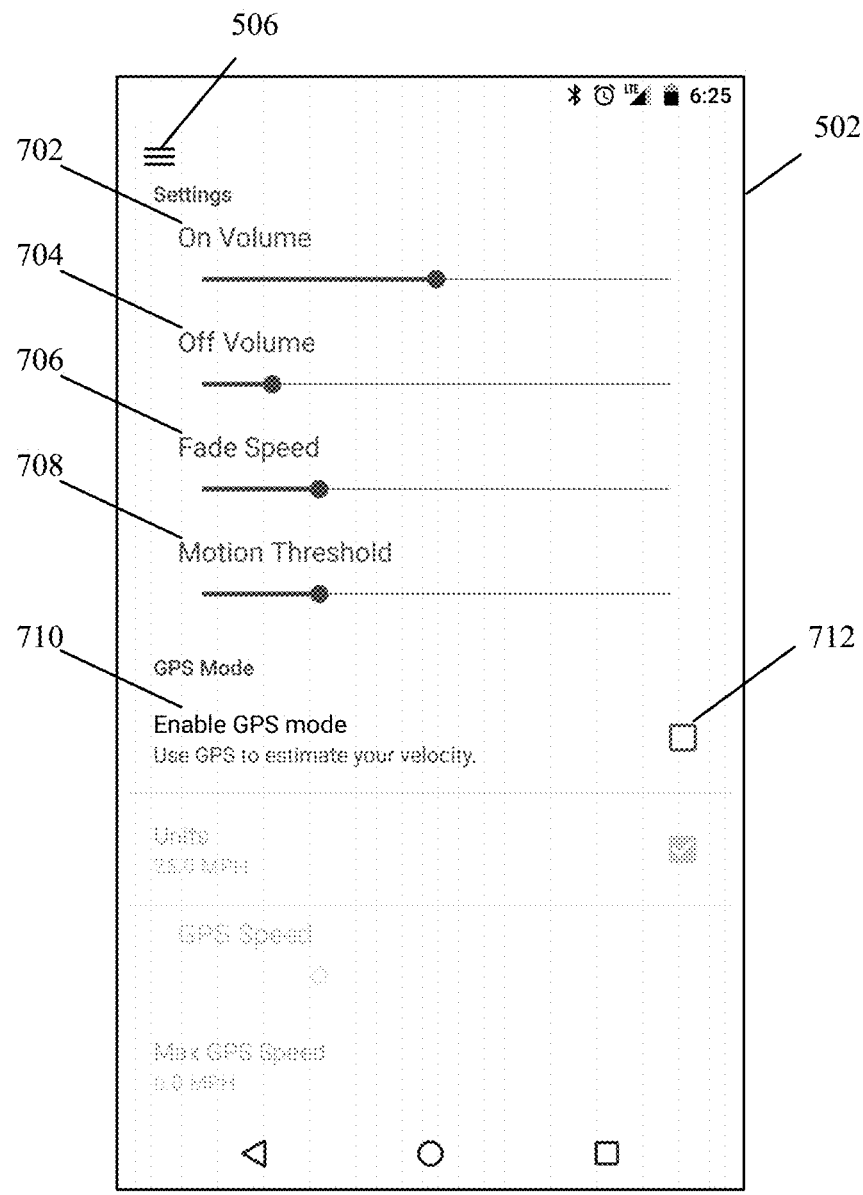
FIG. 7 is an illustration of configuration settings for software logic to automate media volume on a mobile computing device.

FIG. 7 is an illustration of configuration settings for logic to automate audio volume on a mobile computing device. In one embodiment, interacting with the menu icon 506 displayed on the mobile device display may enable the configuration settings for the software logic. The configuration settings include a configurable on volume 702, off volume 704, fade speed 706, and motion threshold 708. The configuration settings illustrated may be used to configure the volume and fade parameters (106, 222, 224). In one embodiment, the on volume 702 specifies the volume to configure when the logic detects motion above the motion threshold 708. In one embodiment, the off volume 704 specifies the volume to configure when the logic detects motion below the motion threshold 708. The on volume 702 is not required to be a higher volume relative to the off volume 704, and the logic can be configured to decrease mobile device media volume or stop media playback when detected or estimated motion is above the motion threshold 708 and increase the mobile device media volume or stop media playback when detected or estimated motion is below the motion threshold 708.

In one embodiment the default motion detection mechanism is a set of one or more motion sensors embedded within the mobile device and an option 710 can be displayed to enable an alternate motion detection mechanism (e.g., "Enable GPS mode"). The optional motion detection mechanism, in one embodiment, may be enabled by activating (e.g., touching, clicking, etc.) a button or icon 712.

Figure 8:
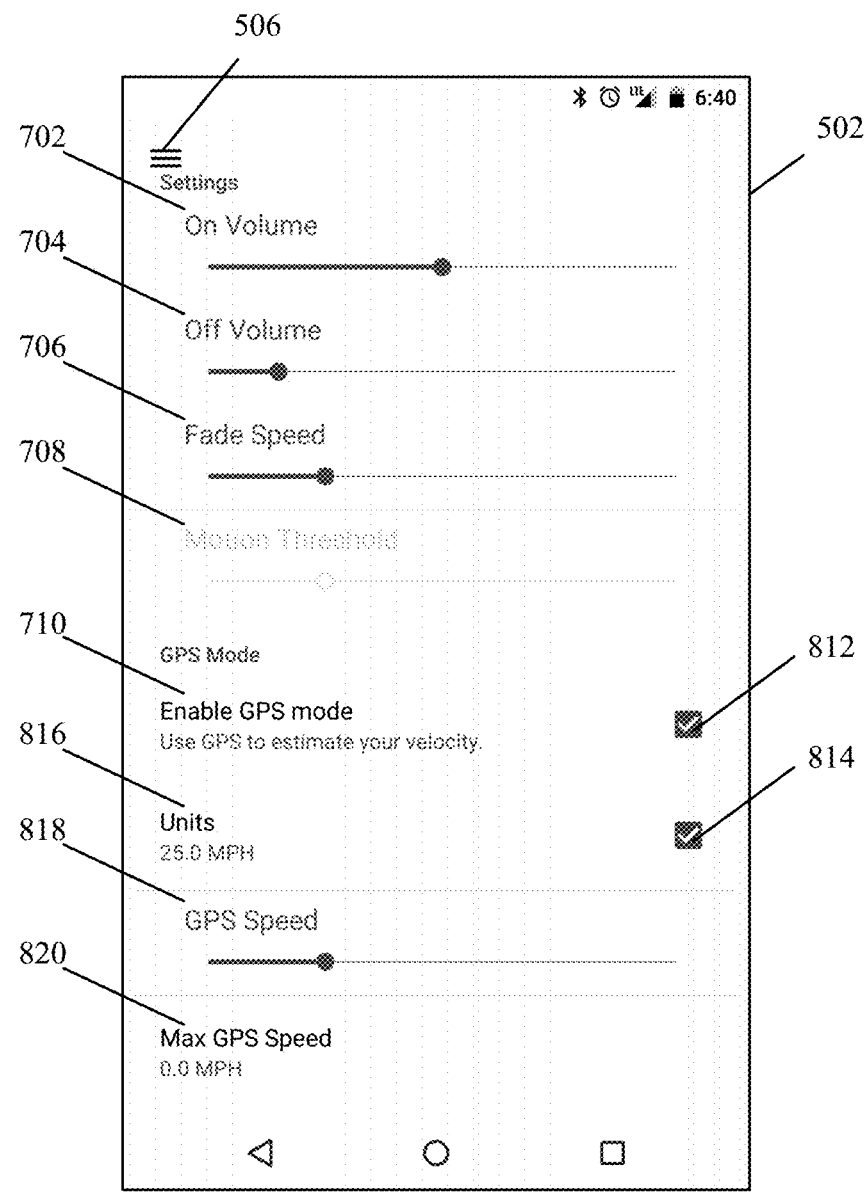
FIG. 8 is an additional illustration of configuration settings for software logic to automate media volume on a mobile computing device.

FIG. 8 is an additional illustration of configuration settings for logic to automate audio volume on a mobile computing device. In one embodiment, enabling the alternate motion detection mechanism (e.g., GPS mode 812) can enable a secondary set of configuration items. One of the secondary configuration items can be a units 816 configuration, which can default to a first set of units (e.g., miles per hour) and can be configured to a second set of units (e.g., kilometers per hour) by triggering a selector, which is illustrated as a checkbox 814. A GPS speed 818 configuration can also be displayed to allow a user to configure a GPS threshold speed at which the automated volume feature will trigger a state change (e.g., via state change unit 210 of FIG. 2. The GPS speed 818 configuration can operate in a similar manner as the motion threshold configuration 708, to configure when an OFF to ON state change occurs. In one embodiment, the motion threshold 708 configuration and GPS speed configuration 818 are mutually exclusive. However, in one embodiment both configurations may be active, for example, if the motion sensor and GPS motion detection mechanisms are both active.

In one embodiment, a max GPS speed 820 is displayed. The max GPS speed can be displayed to enable the configuration of the GPS speed 818. For example, if a user is performing a physical activity (e.g., biking, skiing, snowboarding, etc.), the logic can record the maximum speed attained according to GPS data and retain that information for display, to provide a guideline for the user in configuring the GPS speed 818. In one embodiment, the maximum GPS speed can be used to configure the GPS speed or motion threshold.

Figure 9:
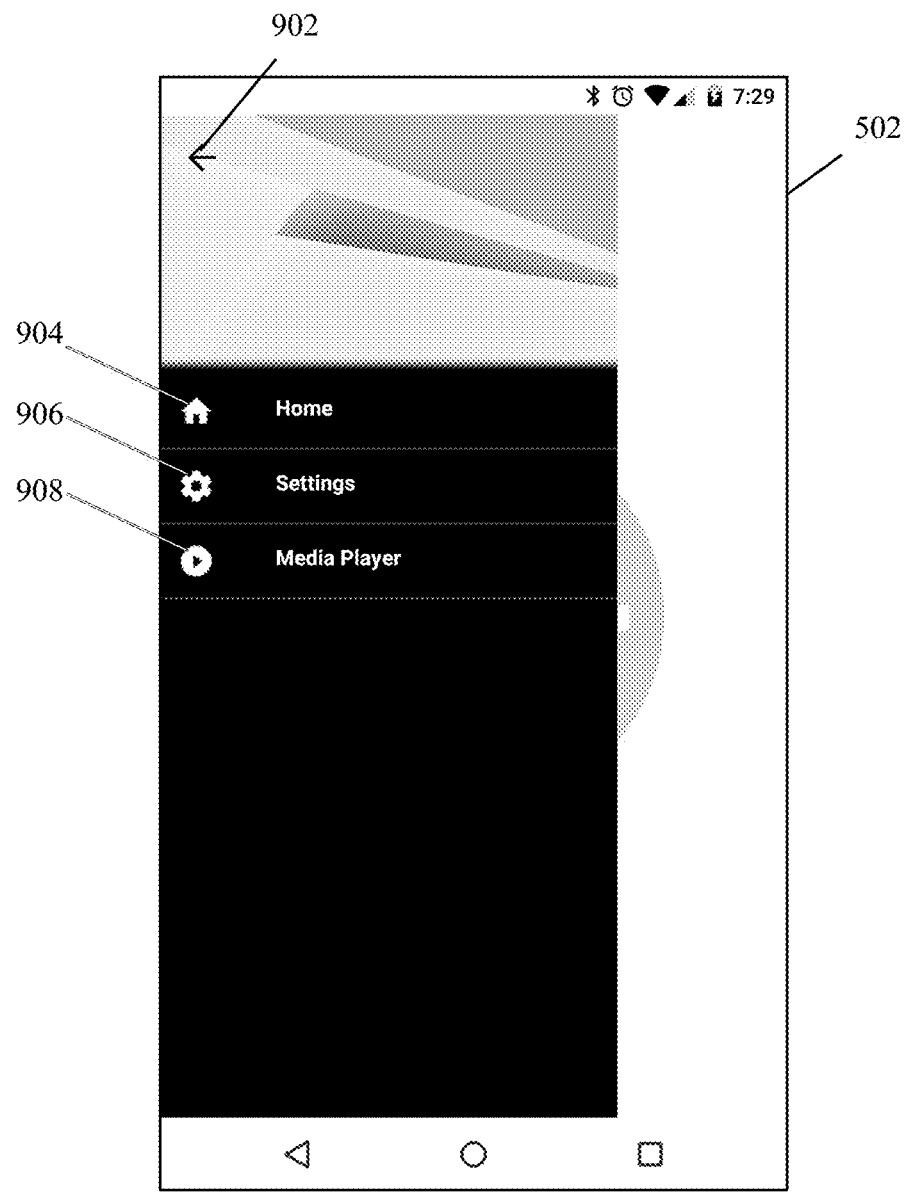
FIG. 9 is a further illustration of configuration settings for software logic to automate media volume on a mobile computing device.

FIG. 9 is a further illustration of configuration settings for logic to automate audio volume on a mobile computing device. In one embodiment, selecting the menu icon 506 shown in FIGS. 5-8 causes a general configuration menu to appear, which includes mechanisms to enable a user to return to a home screen 904, enter settings 906, or to select a media player 908. The configuration menus shown in FIGS. 7-8 can be accessed via the settings 906. The activate/deactivate screens can be reached via the home button 904. In one embodiment, the home button 902 can also be reached via a return arrow 902, which replaces the menu icon 506 while the screen of FIG. 9 is displayed. In one embodiment, the return arrow 902 is configured to hide the general configuration menu.

In one embodiment, a media player button 908 is displayed in the menu screen, to allow the selection of a specific media player application through which music or other audio (news, podcasts, etc.) may be played. The volume automation feature can then be enabled specifically for use with the selected application.

Figure 10:
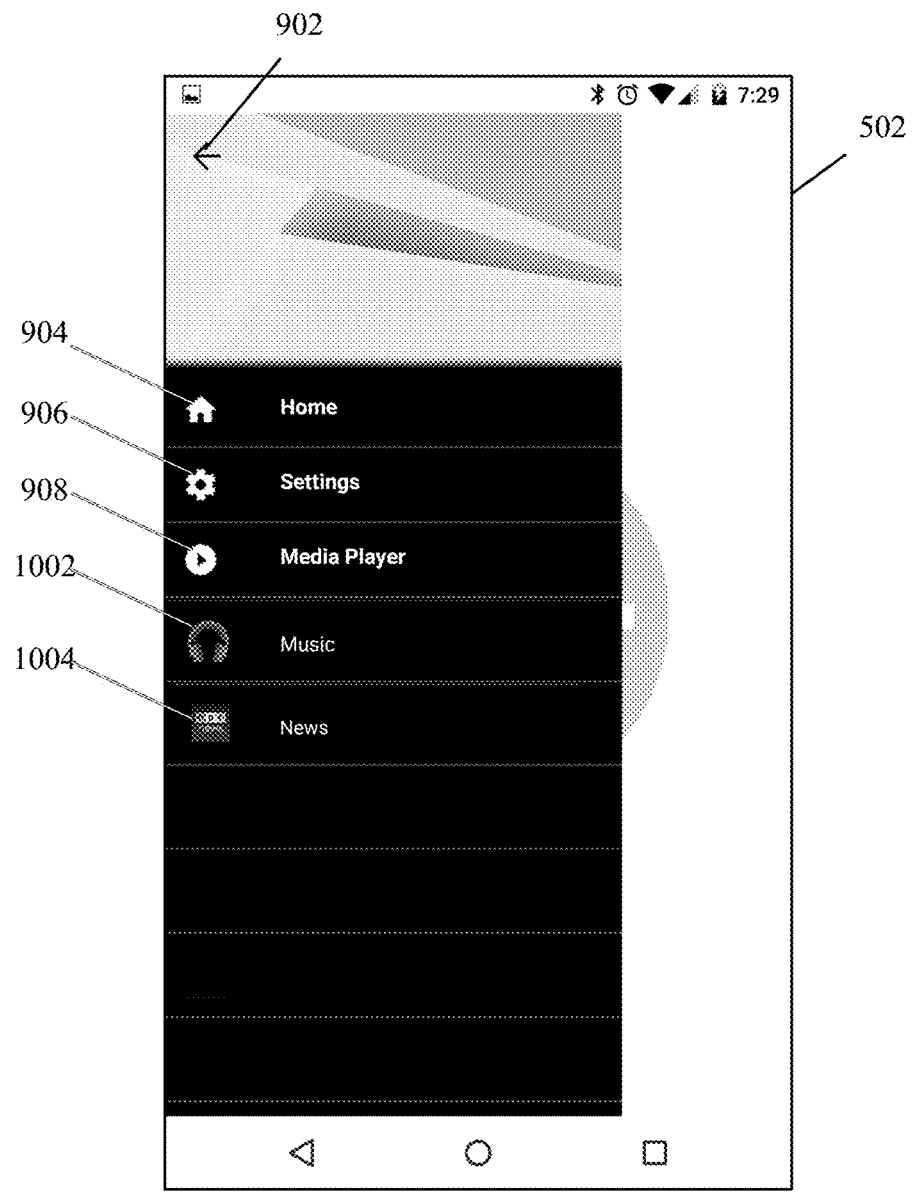
FIG. 10 is an illustration of configuration settings to select a media player for volume automation on a mobile computing device.

FIG. 10 is an illustration of configuration settings to select a media player for volume automation on a mobile computing device. In one embodiment, after selecting the media player button 908, a specific media player application can be selected for use with the volume automation feature. For example, icons to select a music player 1002 or a news application 1004 can be displayed for selection. In one embodiment, the icon list for the media player applications that are displayed is automatically populated based on the media player applications that are installed on the mobile device of the user. Once a media player application (e.g., music 1002, news 1004, or any one of another media playing application on the mobile device) is selected, the volume automation feature of the software logic can be enabled, and audio playback for the media player application can be started or stopped based on the configured parameters and detected motion of the electronic device. In one embodiment, instead of selecting an audio player for volume automation, the previously used media player on the mobile device is used.

Figure 11:
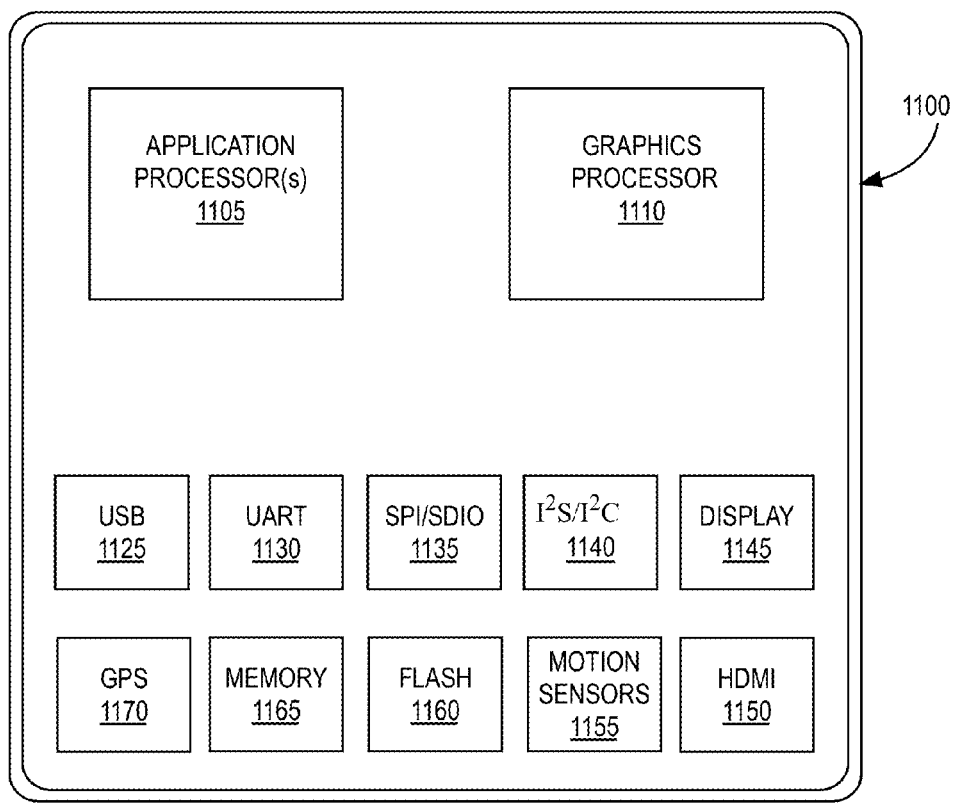
FIG. 11 is block diagram of an exemplary system on a chip processor for use in a mobile computing device.

FIG. 11 is block diagram of an exemplary system on a chip integrated circuit 1100 for a mobile computing device. The exemplary integrated circuit includes hardware logic that may be used by the software logic described herein. The exemplary hardware logic includes one or more application processors 1105 (e.g., CPUs) and at least one graphics processor 1110. The integrated circuit can also include peripheral or bus logic including a USB controller 1125, UART controller 1130, an SPI/SDIO controller 1135, and an I²S/I²C controller 1140. Additionally, the integrated circuit can include a display device 1145 coupled to one or more of a high-definition multimedia interface (HDMI) controller 1150 or coupled to an integrated display device (e.g., via a mobile industry processor interface (MIPI) display interface, or some other internal display interface). Storage may be provided by a flash memory subsystem 1160 including flash memory and a flash memory controller. Memory interface may be provided via a memory controller 1165 for access to SDRAM or SRAM memory devices.

The exemplary integrated circuit additionally includes one or more of a set of motion sensors 1155 and/or a GPS receiver 1170. The set of motion sensors can include inertial sensors such as one or more accelerometers or gyroscopes. The motion sensors 1155 can include functionality for peak detection or steady state measurements and can additionally include advance motion sensing detection mechanisms including multi-axis gyroscopes. The GPS receiver 1170 can provide geographic location information based on signals received from two or more members of an array of orbiting satellites and can be used to determine speed or acceleration of the mobile device based on motion caused by a user. Each of the motion sensors 1155 and the GPS receiver 1170 can be used to determine electronic device motion, for example, during a physical activity such as snowboarding, skiing, mountain biking, etc. In one embodiment, the set of motion sensors 1155 can additionally include a magnetometer to perform additional motion sensing and/or tracking to enhance the motion detection provided by the accelerometer, gyroscopes, and/or GPS.

Figure 12:
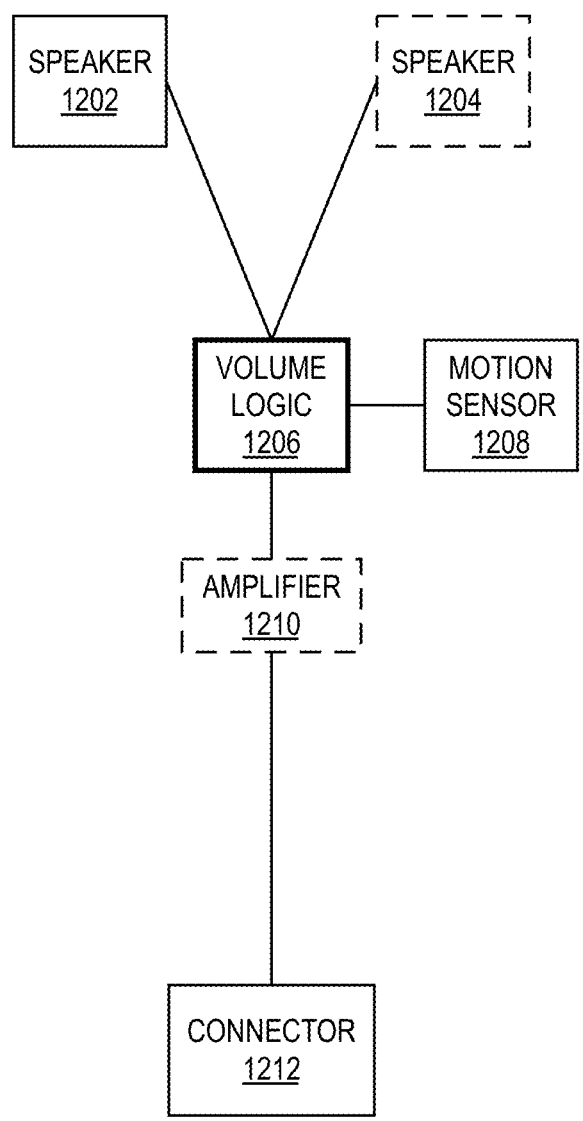
FIG. 12 is block diagram of a headset device including motion volume logic, according to an embodiment.

FIG. 12 is block diagram of a headset device 1200 including motion volume logic, according to an embodiment. In one embodiment, the headset device 1200 includes at least a first speaker 1202 and may include a second speaker 1204. In one embodiment the headset device 1200 also includes volume logic 1206 coupled to a motion sensor 1208. The volume logic 1206 can also couple to a connector 1212, which can be a physical connector device or can be a wireless connection mechanism (e.g., Bluetooth) to couple the headset device 1200, for example, to a mobile computing device. The volume logic 1206 can use the motion sensor 1208 to perform motion sensor based logic described herein, including increasing audio volume received via the connector 1212 when the motion sensor 1208 detects motion above a threshold and reducing the audio volume received when the motion sensor 1208 detects motion below the threshold. In one embodiment, the motion threshold for the volume logic 1206 is pre-configured. In one embodiment, the motion threshold for the volume logic 1206 can be configured via logic executing on a mobile device. For example, and in one embodiment, an application executing on the mobile device can configure the motion threshold, as well as volume and fade parameters (e.g., ON state volume, OFF state volume, etc.), via the connector 1212, and the volume logic 1206 can include a memory device to store the configured motion threshold and volume/fade parameters. In one embodiment, the volume logic 1206 couples with an enable/disable switch, which can enable or disable the volume control logic in a manner similar to the activation region 504 and deactivation region 604 of FIG. 5-6.

The audio volume can be increased by the volume logic 1206 via a remote audio control mechanism to cause a connected mobile device to increase system volume or application volume. While in one embodiment the volume logic 1206 can use a remote audio control mechanism to increase the source volume from a connected mobile device, in one embodiment the headset device 1200 includes an amplifier 1210 device to facilitate audio volume control independently from the configured source volume at the connected mobile device.

In one embodiment, the volume logic 1206 can be configured by a configuration application coupled to the volume logic 1206 via a wireless variant of the connector 1212. In such embodiment, the ON state volume, OFF state volume, fade speed and motion threshold can be configured via the configuration application and the headset device can operate without a persistent connection to a mobile computing device or the configuration application, enabling the headset device 1200 to be used with simplified media players (e.g., MPEG audio players) that lack the ability to execute applications. In such embodiment the volume logic 1206 may be incorporated into the headset device 1200 as illustrated, or may be a standalone circuit module coupled between a simplified media player and a traditional headset device.

In one embodiment, the volume logic 1206 is coupled to a media player device configured to output audio at a sufficiently high volume and the volume from the media player is attenuated or modified based on motion before output to one or more of the first speaker 1202 and second speaker 1204. In one embodiment, the headset device 1200 is a standalone device and may be operated without a configuration application using pre-set or hardware adjustable parameters (e.g., dials, switches, etc.).

Figure 13:
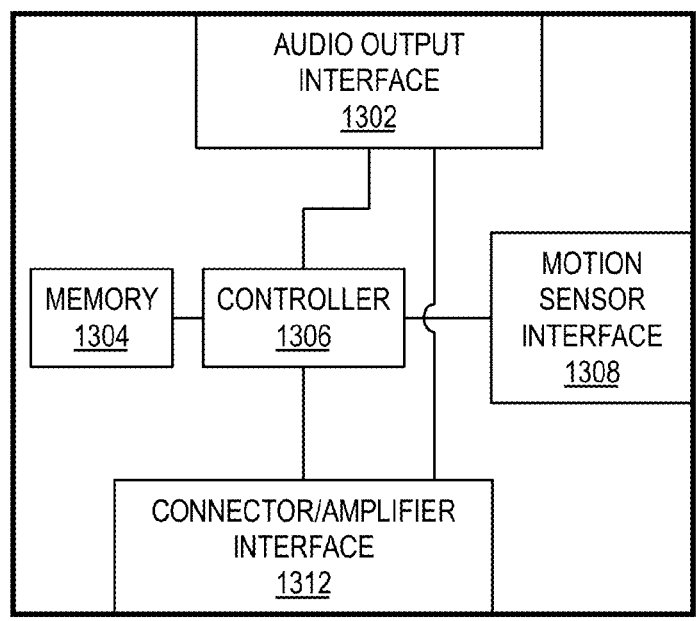
FIG. 13 is a block diagram of volume control logic for a headset device, according to an embodiment.

FIG. 13 is a block diagram of volume control logic 1300 for a headset device, according to an embodiment. In one embodiment, the volume control logic 1300 is a variant of the volume control logic 1206 of FIG. 12. The volume control logic 1300 can include an audio output interface 1302, memory 1304, a controller 1306, a motion sensor interface 1308, and a connector/amplifier interface 1312. The audio output interface 1302 can couple to one or more speaker devices to provide audio output. The memory 1304 can store the relevant parameters (e.g., volume, fade, threshold, etc.) received by the controller 1306 from a computing device (e.g., mobile electronic device) via the connector/amplifier interface 1312. The connector/amplifier interface 1312 can provide audio from the computing device, which may or may not be routed through an amplifier device. In one embodiment, the controller 1306 can control the amplifier output via the connector/amplifier interface 1312. In one embodiment, the controller 1306 includes logic of the motion detection unit 202, state change unit 210, and fade volume unit 220 of FIG. 2. The connector/amplifier interface 1312 can also provide a data interface between the controller 1306 and the computing device. Such data interface may be a wireless data interface, such as Bluetooth, or another wireless data interface. The motion sensor interface 1308 can couple the controller 1308 to one or more motion sensors, which provide motion data to the controller. Using the motion data, the controller can transition the audio volume provided via the audio output interface 1302 between a configured ON state volume and a configured OFF state volume. The audio volume can be transitioned based on audio control input sent to the coupled computing device or based on an adjustment to the output of a coupled amplifier.

In addition to audio volume control as described herein, other motion based interactions with a mobile device may be performed, including synchronized audio playback among multiple mobile computing devices or starting and stopping the recording of video based on the motion of a mobile computing device. One embodiment provides for auxiliary motion control to start, stop, enable, or disable other mobile computing device functions based on the configuration of the controller 1306.

Figure 14:
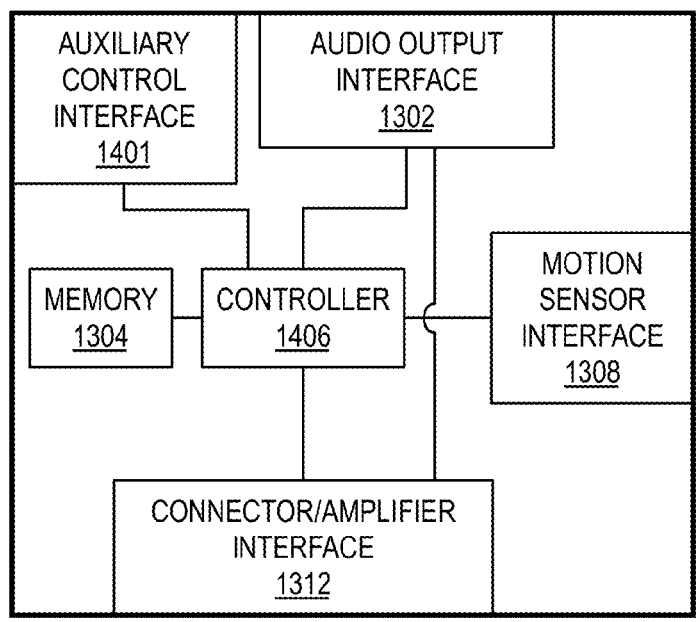
FIG. 14 is a block diagram of auxiliary control logic, according to an embodiment.

FIG. 14 is a block diagram of auxiliary control logic 1400, according to an embodiment. The auxiliary control logic 1400, in one embodiment, can include some components of the volume control logic 1300 for the headset device. Additionally, the auxiliary control logic 1400 can include a controller 1406 configured to additionally interface with an auxiliary control interface 1401. In one embodiment, software modules executing on the exemplary system on a chip integrated circuit 1100 for a mobile computing device, as illustrated in FIG. 11, can perform at least some of the components of the auxiliary control logic 1400.

In various embodiments the auxiliary control interface 1401 can be used to provide control signals to perform motion based control operations similar to the audio volume control described herein. For example, the auxiliary control interface 1401 can be used to engage or disengage video recording on a mobile camera device. Where the auxiliary control logic 1400 is incorporated into a mobile computing device, the auxiliary control interface 1401 can be used to engage or disengage video recording on the mobile computing device in conjunction with performing volume control activities. Engaging or disengaging video recording can be performed using logic similar to the volume control logic described herein. For example and in one embodiment, video recording on a camera can be configured to engage (or disengage) when the detected motion via the motion sensor interface 1308 exceeds a configured motion threshold. The video recording on the camera can be also be configured to disengage (or disengage) when the detected motion via the motion sensor interface 1308 falls below the configured motion threshold. The same thresholds used for volume control may be used or separate thresholds may be configured. Other motion based control operations may also be performed.

In one embodiment the function of the input from the motion sensor interface 1308 may also be provided by data from the motion sensors 1155 of the system on a chip integrated circuit 1100 of FIG. 11. In one embodiment, at least some of the functions of the controller 1406 may be performed by the one or more application processor(s) 1105 of the system on a chip integrated circuit 1100 of FIG. 11.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings and specification. To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core.

The software content of the embodiments described herein can be provided via an article of manufacture with the content stored thereon, or via a method of operating a communication interface to send data via the communication interface. A non-transitory machine or compute readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, specialpurpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for automating a video recording state based on detected physical motion of a mobile device, the method comprising:
    detecting motion of the mobile device based on input motion data from a motion detection mechanism within the mobile device, the motion detection mechanism including a motion sensor, wherein the motion sensor provides the input motion data used to detect motion of the mobile device;
    determining whether detected motion of the mobile device exceeds a configured motion threshold, the detected motion determined based on the input motion data;
    based on the determining, causing a logical state change to transition into an automated video recording state; and
    after the logical state change to transition to the automated video recording state, automatically configuring a video recording state associated with a video recorder based on configured motion threshold parameters, the video recorder coupled to the mobile device, wherein automatically configuring the video recording state includes engaging recording on the video recorder and disengaging recording on the video recorder when detected motion of the mobile device is beneath the configured motion threshold.

2. The method as in claim 1, wherein the motion detection mechanism additionally includes a global positioning sensor receiver.

3. The method as in claim 1, wherein the configured motion threshold is user configurable.

4. The method as in claim 1, wherein the mobile device is a mobile computing device and the video recorder is a separate video recording application.

5. The method as in claim 1, wherein the video recorder is a mobile camera device.

6. The method as in claim 5, wherein the mobile device is externally coupled with the mobile camera device via a control interface.

7. The method as in claim 1, wherein automatically configuring the video recording state includes, after disengaging recording on the video recorder when the detected motion of the mobile device is beneath the configured motion threshold, re-engaging recording when the detected motion of the mobile device is above the configured motion threshold.

8. A system on a mobile device for automating a video recording state based on detected physical motion of the mobile device, the mobile device having one or more processors to execute instructions from a computer readable medium to perform operations of the system, wherein the system comprises:
    a motion detection unit to detect motion of the mobile device based on a motion detection mechanism within the mobile device, the motion detection mechanism including a motion sensor or a global positioning system receiver, wherein one or both of the motion sensor and the global positioning system receiver provides motion data to detect motion of the mobile device;
    a state change unit to determine, based on input from the motion detection unit, whether a change in motion state of the mobile device has occurred and transition into an automated video recording state based on a determination of whether the change in the motion state has occurred; and
    a control interface to couple the mobile device with a mobile camera device, the control interface to signal the mobile camera device to engage video recording on the mobile camera device when the state change unit is to transition into the automated video recording state and to signal the mobile camera device to disengage video recording when detected motion of the mobile device is beneath a motion threshold.

9. The system as in claim 8, wherein the state change unit is further to determine whether a change in the motion state has occurred based on a motion threshold provided to the motion detection unit.

10. The system as in claim 8, wherein the motion threshold is user configurable.

11. The system as in claim 8, wherein the mobile device is to couple with the mobile camera device via the control interface.

12. The system as in claim 11, wherein the control interface is an external interface and the mobile device is to externally connect with the mobile camera device via the control interface.

13. The system as in claim 8, further comprising one or more accelerometers coupled to the motion detection unit to provide motion sensor data.

14. A non-transitory machine-readable medium storing instructions to cause one or more processors on a mobile device to perform operations comprising:
    detecting motion of the mobile device based on input motion data from a motion detection mechanism within the mobile device, the motion detection mechanism including a motion sensor, wherein the motion sensor provides the input motion data used to detect motion of the mobile device;
    determining whether detected motion of the mobile device exceeds a configured motion threshold, the detected motion determined based on the input motion data;
    based on the determining, causing a logical state change to transition into an automated video recording state; and
    after the logical state change to transition to the automated video recording state, automatically configuring a video recording state associated with a video recorder based on configured motion threshold parameters, the video recorder coupled to the mobile device, wherein automatically configuring the video recording state includes engaging recording on the video recorder and disengaging recording on the video recorder when the detected motion of the mobile device is beneath the configured motion threshold.

15. The non-transitory machine-readable medium as in claim 14, wherein the motion detection mechanism additionally includes a global positioning sensor receiver.

16. The non-transitory machine-readable medium as in claim 14, wherein the configured motion threshold is user configurable.

17. The non-transitory machine-readable medium as in claim 14, wherein the mobile device is a mobile computing device and the video recorder is a separate video recording application.

18. The non-transitory machine-readable medium as in claim 14, wherein the video recorder is a mobile camera device.

19. The non-transitory machine-readable medium as in claim 18, wherein the mobile device is externally coupled with the mobile camera device via a control interface.

20. The non-transitory machine-readable medium as in claim 14, wherein automatically configuring the video recording state includes, after disengaging recording on the video recorder when the detected motion of the mobile device is beneath the configured motion threshold, re-engaging recording when the detected motion of the mobile device is above the configured motion threshold.

* * * * *